3,764,475
ENZYMATIC HYDROLYSIS OF CELLULOSE TO
SOLUBLE SUGARS
Mary H. Mandels, Natick, and John A. Kostick, Sherborn, Mass., assignors to the United States of America as represented by the Secretary of the Army
No Drawing. Filed Dec. 22, 1971, Ser. No. 211,048
Int. Cl. C12d 13/04
U.S. Cl. 195—33 R                                   10 Claims

ABSTRACT OF THE DISCLOSURE

A method for immobilization of the enzyme, cellulase, by adsorption on its insoluble substrate, cellulose, permits simple methods for efficient enzymatic hydrolysis of cellulose to glucose. A stable cellulase enzyme obtained from a culture of Trichoderma viride QM 9123 is combined with cellulose to form a suspension having at least 100 parts by weight of cellulose to each part by weight of crude enzyme protein. The cellulose-cellulase suspension is maintained at a pH of from 4.0 to 5.0 and the temperature is maintained within the range of from 25° to 50° C. during hydrolysis. Under these conditions and with the continuous addition of fresh cellulose to maintain the above ratio of cellulose to cellulase, the cellulase enzyme is effectively immobilized by adsorption on unhydrolyzed cellulose, allowing the removal of the soluble sugars by simple separation procedures while retaining most of the otherwise soluble enzyme material.

The invention described herein may be manufactured, used and licensed by or for the Government for governmental purposes without the payment to us of any royalty thereon.

BACKGROUND OF THE INVENTION

This invention relates to the enzymatic hydrolysis of cellulose to soluble sugars and to the immobilization of cellulase enzyme by adsorption on cellulose substrate.

Cellulose, a principal constituent of all plant life, is the most abundant polymer on the earth having an estimated total annual production in excess of $10^{11}$ tons. Aside from this natural worldwide abundance, cellulose is the major component of much waste material, for example, agricultural waste in the form of straw, leaves, stalks, hulls, shells, bagasse, etc., wood waste such as sawdust, chips, bark, etc. and urban waste principally in the form of paper refuse. A non-soluble, polymer, cellulose is made up of repeating units of glucose, a monosaccharide that can be directly assimilated by most organisms and is the chief source of energy for plants and animals. The utilization of cellulose in the production of glucose or other useful by-products is hampered by the fact that the cellulose polymer is extremely resistant to degradation. While some microorganisms have the ability to enzymatically hydrolyze cellulose and some animals, e.g., ruminants, can convert cellulose to animal protein, all attempts, until recently, to convert raw cellulose to its monomeric constituents on a large scale have proven unsuccessful from a technical or cost standpoint. A practical, economic process for the conversion of cellulose to more useful products would not only aid in reducing waste pollution, but would also provide new sources of food and fuel. Recently there has been developed a process, disclosed in the co-pending U.S. patent application of Tarun K. Ghose, entitled "Enzymatic Saccharification of Cellulose," Ser. No. 1,478, filed Jan. 8, 1970, now U.S. Pat. 3,642,580, which shows considerable promise for the conversion of cellulose to simple sugars by enzymatic hydrolysis. Previously, enzymatic hydrolysis of cellulose had been considered to be too slow and inefficient a method for converting cellulose to simple sugars, and, in on way could have been compared with the very successful enzymatic conversion of starch to glucose by means of the fungal enzyme amyloglucosidase. A number of technical discoveries, such as the identification of fungal organism Trichoderma viride as the source of a stable enzyme which can completely hydrolyze even the most resistant form of cellulose, the discovery of a mutant strain of Trichoderma viride capable of producing twice as much cellulase enzyme as the parent organisms, the prior treatment of cellulose to increase reactivity and bulk density and finally, the application of ultrafiltration membranes to retain enzyme and cellulase components while separating out the glucose syrup, have all contributed toward a technically successful process for the quanitative conversion of cellulose polymer to its sugar components.

The enzyme material, cellulase, is not consumed in the hydrolysis reaction and is also stable under the conditions of hydrolysis and can, therefore, be used indefinitely if some method is provided to retain this material in the system. Due to the water soluble nature of the enzyme protein, it has been found necessary to use an ultrafiltration technique to separate the sugar syrup from the insoluble cellulose and soluble enzyme reactants without serious loss of the soluble enzyme. Ultrafiltration is a technically effective technique for bringing about the desired separation because of its ability to discriminate between soluble materials of differing molecular weight, but it is also a costly technique that is disadvantageous from an economic standpoint. We have discovered a procedure whereby the ultrafiltration step can be completely eliminated and the sugar syrup can be withdrawn from the cellulose-cellulase-sugar syrup mixture without loss of the enzyme. The elimination of the ultrafiltration separation procedure results in a more economical process for the hydrolysis of cellulose.

SUMMARY

The invention relates to a process for the enzymatic hydrolysis of cellulose to soluble sugars wherein the sugar solution is withdrawn from the reactant mixture without any significant loss of soluble enzyme by immobilizing the enzyme on an excess of unhydrolyzed cellulose in the system. The enzyme is strongly adsorbed on excess unhydrolyzed cellulose at a pH of 4.0 to 5.0 and at temperatures within the range of from 25° to 50° C.

DESCRIPTION OF THE PREFERRED EMBODIMENTS

Several mircoorganisms in nature, mostly, fungi, are capable of elaborating a complex enzyme system which is responsible for hydrolyzing cellulose into simple sugars. The enzyme complex includes endo and exo glucanases which hydrolyze the glucosidic links and a pre-hydrolysis factor ($C_1$) that permits the glucanases to act on insoluble cellulose. Among the microorganisms, the fungus Trichoderma viride has been found to be, thus far, the most useful, in that it produces the highest levels of a stable cellulase capable of total hydrolysis of insoluble cellulose, i.e., it is rich in the pre-hydrolysis factor ($C_1$). The preferred strain for the production of cellulase is Trichoderma viride (Tv) mutant QM 9123 produced by the irradiation of the parent strain (Tv QM 6a) with a high energy electron beam from a linear accelerator, Mandels, Weber, Parizek, Applied Microbiology, 21, pages 152–154, 1971. This mutant strain has a two-fold increase in cellulase activity over the parent strain. The organism is cultured in a mineral medium containing 1% cellulose in shake flasks or submerged cultures. After 10 to 14 days culture at 28 to 29° C., the culture broth is filtered off to remove the residual solids yielding a culture filtrate containing 0.5–0.7 mg. of protein per ml. The pH of the culture filtrate is adjusted to 4.8–5.0 with a 0.5 M citrate buffer and merthiolate at 0.005% is added to prevent microbial growth. This culture filtrate is used directly as the crude enzyme without further processing. The production of cellulase is described in detail in an article by Mandels and Weber entitled "The Production of Cellulases" appearing in the Advances in Chemistry Series, ACS, 95, 391–414.

The activity of the cellulase enzyme in the culture filtrate can be expressed or measured by the carboxymethyl-cellulose hydrolysis method (Cx units/ml.) or the Filter Paper Assay Procedures (FP Activity) as described in the Mandels and Weber paper referred to above. The activity of freshly prepared culture filtrates of the mutant strain ranges from about a FP activity of 2.0–4.0 which is a two-fold increase in activity over that produced by the parent (Tv QM 6a) organism. If a more highly active enzyme solution is required to bring about more rapid hydrolysis of cellulose, the culture filtrate may be concentrated by standard ultrafiltration techniques. Membranes having molecular size cut-off capabilities of from 20,000 to 30,000 have proven effective in concentrating the cellulase enzymes. A 5-fold volume concentration brought about by ultrafiltration results in a corresponding 3 to 4-fold increase in enzyme activity as measured by the Assay Procedures. For purposes of this invention, the cellulase enzyme should have a FP activity of at least 2.0 and, preferably, in excess of 4.0.

Cellulose, the raw material or substrate, is a straight chain polymer of glucose units and if hydrolyzed, is converted to glucose and to other polysaccharides such as cellobiose, cellotriose, cellotetraose and cellopentaose. It is desirable that the cellulose be fairly pure to reduce unwanted soluble impurities in the process. It is important that the resistant nature of native cellulose due to the strong H-bonding across the cellulose chains of crystalline microfibrils be overcome by rupturing the cell fibers thereby reducing the particle size and increasing the reactive surface. The particle size of the cellulose should preferably be reduced to less than 50 microns. Cellulose may be reduced in particle size by dry milling or some other suitable pulverizing technique. The rate of cellulose reaction with the cellulase enzyme increases with a reduction in cellulose particle size. It has been found that dry cellulose (less than 3% of moisture by weight) is more reactive when added to the enzyme solution since wet cellulose tends to recrystallize.

In addition to the reduction in particle size of the cellulose substrate, the ratio of substrate to enzyme has a significant effect on the reaction rate. Dense suspensions of finely ground cellulose, wherein the solids contents of the substrate in the cellulase suspension comprise 10% to 30% are found to be highly reactive in a system in which the suspension is vigorously agitated in the presence of a highly concentrated (1–2 mg. protein/ml.) enzyme culture filtrate solution. It is desirable, however, in such a system, to remove the sugar products being formed from the suspension to prevent product inhibition. Such a system works most efficiently if the sugar products being formed are continuously removed.

Removal of soluble sugar products from the cellulose-cellulase-sugar system appeared as a significant obstacle to the development of a practical process for the hydrolysis of cellulose. Due to the water solubility of the enzyme material, simple mechanical filtration would result in the loss of or withdrawal of enzyme along with the sugar solution. In the previously referred to application of Tarun K. Ghose, separation of the sugar component without removal of enzyme was effected by means of pressure filtration through a molecular sieve membrane (ultrafiltration membrane). Ultrafiltration is a necessarily slow and relatively costly procedure, but one that was considered to be necessary if the valuable enzyme component was to be retained and reused. We have discovered, however, that cellulose strongly adsorbs cellulase enzyme at a pH of 4.0 to 5.0 and at temperatures within the range of 25° to 50° C., conditions which are also optimum for enzyme hydrolysis. The adsorbed enzyme is released as the cellulose is hydrolyzed and is readsorbed to be reused on fresh or excess cellulose. The quantity of enzyme and protein in the culture filtrate taken up or adsorbed by cellulose will depend in part on the concentration of cellulose, particle size of the cellulose and pH and temperature of the solution. In general, though, it may be said that the actual uptake or adsorption of protein from the culture filtrate will range from 0.005 to 0.064 mg. per mg. of cellulose under the above conditions. A 20% concentration of cellulose will adsorb 90% of the enzyme component from a more concentrated culture filtrate (2.0 mg. protein/ml.). It is clear that to maximize adsorption of cellulase enzyme, it is essential to maintain a high concentration of cellulose. A 10% concentration of cellulose is adequate to adsorb 90% of the enzyme component in a concentrated culture filtrate (1.0 mg. protein/ml.). As hydrolysis proceeds, it is of course, essential to replenish the system to maintain the desired cellulose concentration and to likewise replenish the water lost with the sugar component with fresh buffered solution. Dilute enzyme (0.1 mg. protein/ml.) can be added to the replenishing buffer to make up for losses due to incomplete adsorption and/or denaturation or inactivation of enzyme.

With the effective immobilization of the cellulase enzyme on the unhydrolyzed cellulose substrate, the sugar solution can be separated from the enzyme-cellulose complex by any simple separation or filtration technique, such as mechanical filtering, decanting, or elution from a packed column but not including techniques such as ultrafiltration.

The following examples describe in detail the process of this invention:

Example I 300 g. of milled cellulose was suspended in three liters of cellulase (0.7 mg. protein/ml.) solution in a 5 liter vessel immersed in a water bath at 50° C. The mixture was continuously stirred with a motor driven stainless steel impeller blade at 100 r.p.m. Buffered water was fed continuously into the mixture at a rate to maintain a 3 liter volume in the reaction vessel. The sugar solution formed by the enzymatic hydrolysis was removed through the top of an L-shaped side arm originating at the base of the reaction vessel by means of a pump. Almost all of the cellulose in the unstirred side arm settled back into the reactor, but a coarse sintered glass filter is set in the side arm to exclude any particles from the harvest. The cellulose used was a purified spruce pulp, Solka-Floc SW 40A (Brown Co., Berlin, N.H.) which was milled dry for 24 to 70 hours in a porcelain pot mill. The average particle size of the milled cellulose was 50 microns. The enzyme cellulase was obtained from the growth of the fungus *Trichoderma viride* QM 9123 in a 0.75% cellulose medium for 13 days. The culture was filtered through glass wool and the culture filtrate which contained 0.5–0.7 mg. protein/ml. was adjusted to a pH of 4.8 with 0.05 M citrate buffer. Milled dry cellulose was fed continuously from time 0 at a rate of from 2.3 gr./hr. to maintain the cellulose concentration at 10%. At 23 hours, when glucose in the reactor approached 5%, a feed of buffered water was begun and glucose syrup removed at an equal rate from the side arm. The process was terminated after 164 hours. Glucose concentration in the reactor remained between 4.7 and 6.1% from 23 to 164 hours despite removal of 1.4 volumes of effluent with no replenishment of enzyme. Glucose production from 0–164 hours equaled 0.8 g./liter/hr.

Example II

Example I was repeated using 600 g. of milled cellulose having a particle size of less than 43 microns. A cellulase enzyme culture filtrate produced as described in Example I was concentrated by ultrafiltration to produce a solution having 1.8 mg. protein/ml. Cellulose was maintained in the reactor at 20% concentration by continuously feeding dry cellulose into the reactor. After 26 hours 0.05 M citrate having a pH of 4.5 buffer solution was fed into the reactor at 50 ml./hr. and the sugar syrup removed by filtration through a porous Aloxite (coarse) stone which excludes cellulose but allows passage of glucose syrup at a fast flow rate. Glucose concentration remained at 9–14% until 168 hours when 2.2 volumes of effluent had been collected. Glucose concentration then declined slowly to 5.4% at 264 hours when 4 volumes of effluent had been collected and the experiment terminated. Glucose production continued from 0–264 hours despite removal of 4 volumes of effluent which would have removed over 99% of the enzyme had it been free in solution. Glucose production continued from 0–264 hours in the reactor and averaged 1.50 gm. per liter per hour.

Example III

A column 50 cm. long (5 cm. I.D.) and U-shaped so that fresh cellulose could be added at the effluent end was immersed in a 50° C. bath. A straight column 50 cm. long fitted to one end of the U by a ground glass joint provided hydrostatic pressure on the column. 400 g. of milled cellulose (20 micron particle size) was suspended in two liters of concentrated culture filtrate (1.0 mg. protein/ml.), prepared as in Example II, and poured into the column. Effluent was collected after 73 hours. 200 g. fresh cellulose was added as digestion occurred. The column was eluted with excess fluid from the initial suspension column and then with dilute enzyme (0.1 mg. protein/ml. in 0.05 M citrate buffer, pH 4.8). In 24 days, including the initial 73 hours, 3460 ml. of effluent containing 363.5 g. of glucose (average concentration 10.5%) was collected. Yield was 144 ml. effluent containing 15.3 g. of glucose per day.

Example IV

A straight jacketed column (3.5 cm. I.D.) and 50 cm. long maintained at 50° C. was used. 200 g. of unmilled cellulose was suspended in 2 liters of unconcentrated enzyme culture filtrate (0.48 mg. protein/ml.) and poured into the column. Effluent was collected after 23 hours. 100 g. of fresh cellulose suspended in one liter of enzyme was added as digestion occurred. The column was eluted with excess liquid from the suspensions and with 0.05 M citrate buffer pH 4.8. In 16 days (including the original 23 hours) 4080 ml. of effluent containing 207 g. of glucose was collected (average concentration 4.8%). Yield was 270 ml. effluent containing 13 g. glucose per day.

Digestion of cellulose in columns offers a simple process of wide applicablility. Dilute enzyme preparation is passed through the column and is concentrated thereby adsorption of the cellulose. Cellulose particle size is not critical and particle sizes much large than 50 microns can be used. No stirring or pumping is required and glucose is removed in the effluent at concentrations controlled by the flow rate and rate of digestion.

The glucose syrup produced by this process can be dried and purified by crystallization if desired. Glucose is widely used in bakery products and in other processed foods. The crude syrup need not, however, be purified for many practical applications. For example, the syrup can be concentrated to a molasses for feeding cattle and other animals and used as an additive to ensilage. With the current emphasis on clean burning fuels to minimize pollution, the potential for using glucose syrup as a substrate for microorganisms that can ferment glucose to ethanol appears attractive. Protein rich microorganisms grown on the syrup can be a food supplement for animals or for humans. This could be the most important application in countries that are deficient in protein sources.

This invention provides a novel process for immobilization of cellulase thus permitting the rapid enzymatic hydrolysis of an insoluble substrate, cellulose, into soluble sugar products, principally glucose and at the same time, allows harvest of the sugar products from the reaction mixture free of either enzyme or substrate. Thus, it is possible to reuse the valuable enzyme components, making use of its catalytic capabilities to the maximum extent.

We claim:

1. A method for the enzymatic hydrolysis of cellulose to soluble sugars wherein the water soluble enzyme component, cellulase, is retained on the insoluble cellulose substrate allowing the aqueous sugar solution to be separated from the insoluble cellulose free from soluble cellulase enzyme, comprising the steps of
    (a) combining dry cellulose with an aqueous solution of cellulase enzyme in a suitable reaction vessel,
    (b) holding the cellulose, cellulase and water mixture in said vessel under conditions which promote the hydrolysis of cellulose,
    (c) maintaining sufficient cellulose in the mixture to retain the cellulase by adsorption on cellulose,
    (d) separating the clear aqueous solution from unhydrolyzed, insoluble cellulose after hydrolysis of some of the cellulose, said solution containing soluble sugars and being free of soluble cellulase which is retained on the insoluble, unhydrolyzed cellulose, and
    (e) adding dry cellulose to replace the cellulose hydrolyzed and water to replace that removed from the mixture with the sugar solution.

2. A method according to claim 1 wherein the mixture of cellulose, cellulase and water always contains at least 100 parts by weight of cellulose to each part by weight of cellulase crude enzyme protein.

3. A method according to claim 2 wherein the cellulose-cellulase mixture is maintained at a pH of from 4.0 to 5.0 and at a temperature within the range of from 25° to 50° C.

4. A method according to claim 3 wherein the cellulose has a particle size of less than 50 microns.

5. A method according to claim 4 wherein the cellulose has a particle size of less than 25 microns.

6. A method according to claim 5 wherein the enzyme is obtained from a *Trichoderma viride* (QM 9123) culture filtrate.

7. A method according to claim 6 wherein the culture filtrate is concentrated to obtain an enzyme concentration having a FP activity greater than 4.0.

8. A method according to claim 7 wherein the water added to the mixture is buffered to a pH between 4.0 and 5.0.

9. A method according to claim 8 wherein the sugar solution is removed by simple filtration.

10. A method according to claim 9 wherein the reaction occurs in a packed column and the soluble sugar component is eluted from said column.

References Cited

Mandels et al., J. Polymer Sci., No. 36, pp. 445–59, June 1971.

Ghose et al., Celluloses and their Applications, pp. 415–46, 1968.

A. LOUIS MONACELL, Primary Examiner

T. G. WISEMAN, Assistant Examiner

U.S. Cl. X.R.

195—66 R